US010574304B2

(12) United States Patent
Koskela et al.

(10) Patent No.: US 10,574,304 B2
(45) Date of Patent: Feb. 25, 2020

(54) METHOD, SYSTEM AND APPARATUS OF BEAM SELECTION

(71) Applicant: NOKIA SOLUTIONS AND NETWORKS OY, Espoo (FI)

(72) Inventors: Timo Koskela, Oulu (FI); Samuli Heikki Turtinen, Ii (FI); Juha Pekka Karjalainen, Oulu (FI); Sami-Jukka Hakola, Kempele (FI); Mihai Enescu, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/099,687

(22) PCT Filed: May 10, 2016

(86) PCT No.: PCT/EP2016/060408
§ 371 (c)(1),
(2) Date: Nov. 8, 2018

(87) PCT Pub. No.: WO2017/194094
PCT Pub. Date: Nov. 16, 2017

(65) Prior Publication Data
US 2019/0089420 A1 Mar. 21, 2019

(51) Int. Cl.
*H04B 7/02* (2018.01)
*H04B 7/0408* (2017.01)
(Continued)

(52) U.S. Cl.
CPC ......... *H04B 7/0408* (2013.01); *H04B 7/0417* (2013.01); *H04B 7/0617* (2013.01);
(Continued)

(58) Field of Classification Search
CPC .... H04B 7/0408; H04B 7/088; H04B 7/0417; H04B 7/0639; H04B 7/0617; H04B 7/0695; H04W 24/02
(Continued)

(56) References Cited

U.S. PATENT DOCUMENTS

| 8,929,322 B1 * | 1/2015 | Kludt ................ H04W 72/085 |
| | | 342/379 |
| 2013/0301454 A1 | 11/2013 | Seol et al. |

(Continued)

FOREIGN PATENT DOCUMENTS

| JP | 2014527367 A | 10/2014 |
| WO | 2014183693 A1 | 11/2014 |

OTHER PUBLICATIONS

International Search Report and Written Opinion for International Application No. PCT/EP2016/060408, dated Jan. 13, 2017, 12 pages.

(Continued)

*Primary Examiner* — Don N Vo
(74) *Attorney, Agent, or Firm* — Brake Hughes Bellermann LLP

(57) ABSTRACT

A method comprising: performing one or more measurements in a user device to determine a plurality of beam groups, each beam group associating at least one receive beam direction of a user device and at least one transmit beam direction of an access point; and causing information on said beam groups to be transmitted to said access point.

19 Claims, 9 Drawing Sheets

(51) Int. Cl.
    *H04B 7/06*           (2006.01)
    *H04B 7/08*           (2006.01)
    *H04B 7/0417*       (2017.01)
    *H04W 24/02*       (2009.01)

(52) U.S. Cl.
    CPC ......... *H04B 7/0639* (2013.01); *H04B 7/0695* (2013.01); *H04B 7/088* (2013.01); *H04W 24/02* (2013.01)

(58) Field of Classification Search
    USPC ....................................................... 375/267
    See application file for complete search history.

(56) References Cited

U.S. PATENT DOCUMENTS

| | | | |
|---|---|---|---|
| 2014/0226453 A1* | 8/2014 | Harel | H04B 7/0413 370/201 |
| 2015/0257073 A1 | 9/2015 | Park et al. | |
| 2015/0282122 A1 | 10/2015 | Kim | |
| 2017/0238297 A1* | 8/2017 | Benjebbour | H04B 7/0404 370/329 |
| 2017/0295595 A1* | 10/2017 | Yang | H04W 74/0816 |

OTHER PUBLICATIONS

Office Action for Japanese Application No. 2018-559343, dated Dec. 3, 2019, 12 pages.

\* cited by examiner

METHOD, SYSTEM AND APPARATUS OF BEAM SELECTION

CROSS-REFERENCE TO RELATED APPLICATIONS

This application is a national stage entry of PCT Application No. PCT/EP2016/060408 filed May 10, 2016, entitled "METHOD, SYSTEM AND APPARATUS OF BEAM SELECTION" which is hereby incorporated by reference in its entirety.

FIELD

Some embodiments relate to a method, system and apparatus in a scenario where beam forming of transmission and/or receiving beams is used.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. Another example communication system is so called 5G radio access technology.

Where beam forming is used for communication between an access point and a user equipment, the amount of system overhead relating to training, beam tracking and beam switching may be relatively high.

SUMMARY

In a first aspect there is provided a method comprising: performing one or more measurements in a user device to determine a plurality of beam groups, each beam group associating at least one receive beam direction of a user device and at least one transmit beam direction of an access point; and causing information on said beam groups to be transmitted to said access point.

According to some embodiments, the method comprises causing preference information to be provided to said access point indicating which of said groups is to be preferentially used.

According to some embodiments, said user equipment is to receive using p-n groups at a time where p is the number of groups and n is less than p, causing information to be provided to said access point indicating which p-n of the groups is to be used.

According to some embodiments, the method comprises receiving from said access point using at least one but not all of said groups and subsequently receiving from said access point using a different one or more of said groups.

According to some embodiments, the method comprises after one or more groups have been defined, if for a current group, one or more beams are different, causing a request to be transmitted to said access point requesting said access point to transmit reference signals.

According to some embodiments, the reference signals can be beam specific reference signals.

According to some embodiments the method comprises performing said measurements with respect to beam specific reference signals of respective transmit beam directions.

According to some embodiments, said performing comprises performing beam quality measurements.

According to some embodiments, the method comprises obtaining respective identity information from one or more transmitted beams.

According to some embodiments, the respective identity information comprises a respective beam specific reference signal.

According to some embodiments, said information comprises one or more of beam quality information and beam identity information.

According to some embodiments, said at least one transmit beam is received in a plurality of sweep blocks.

According to some embodiments, the identity information comprises sweep block information.

According to some embodiments, the method comprises causing said information on said at least one beam group to be provided in response to an event.

According to some embodiments, the method comprises receiving a request from said access point and in response to said request, causing said information to be transmitted to said access point.

According to some embodiments, said information on the plurality of groups is transmitted separately.

According to some embodiments, said information on the plurality of groups is transmitted together.

According to some embodiments, at least one group comprises two or more receive beams.

According to some embodiments, at least one group comprises two or more transmit beams.

According to some embodiments, the method comprises using said plurality of beam groups to determine which receive beam direction(s) of said access point and transmit beam direction(s) of said user device to use.

In a second aspect there is provided a computer program comprising computer executable instructions which when run on one or more processors perform the method of the first aspect.

In a third aspect there is provided a computer program embodied on a non-transitory computer-readable storage medium, the computer program comprising program code for controlling a process to execute a process, the process comprising performing one or more measurements in a user device to determine a plurality of beam groups, each beam group associating at least one receive beam direction of a user device and at least one transmit beam direction of an access point; and causing information on said beam groups to be transmitted to said access point.

In a fourth aspect there is provided a method comprising: receiving information at an access point from a user device about a plurality of beam groups, each beam group associating at least one receive beam direction of the user device and at one transmit beam direction of the access point; and using information on said beam groups to control which transmit beam(s) are to be used to transmit to said user device.

According to some embodiments, the method comprises preference information indicating which of said groups is to be preferentially used.

According to some embodiments, the method comprises receiving a reference signal transmission request for one or more beam directions and in response thereto causing the transmission of said reference signal in said one or more beam directions.

According to some embodiments, the reference signal can be beam specific reference signal.

According to some embodiments, the method comprises transmitting to said user equipment using p-n groups at a time where p is the number of groups and n is less than p, wherein said preference information indicates which p-n of the groups is to be used.

According to some embodiments, the method comprises determining a failure condition associated with one or said groups and in response thereto using a different one or more of said groups.

According to some embodiments, the method comprises transmitting said at least one transmit beam in a plurality of sweep blocks to said user device.

According to some embodiments, the method comprises causing a request to be sent from said access point to the user device and in response to said request, receive said information on said at least one beam group from said user device.

According to some embodiments, at least one group comprises two or more receive beams.

According to some embodiments, said at least one group comprises two or more transmit beams.

In a fifth aspect there is provided a computer program comprising computer executable instructions which when run on one or more processors perform the method of the fourth aspect.

In a sixth aspect there is provided a computer program embodied on a non-transitory computer-readable storage medium, the computer program comprising program code for controlling a process to execute a process, the process comprising performing one or more measurements in a user device to determine a plurality of beam groups, each beam group associating at least one receive beam direction of a user device and at least one transmit beam direction of an access point; and causing information on said beam groups to be transmitted to said access point.

In a seventh aspect there is provided an apparatus comprising at least one processor; and at least one memory including computer program code; the at least one memory and the computer program code configured to, with the at least one processor, cause the apparatus at least to: perform one or more measurements in a user device to determine a plurality of beam groups, each beam group associating at least one receive beam direction of a user device and at least one transmit beam direction of an access point; and cause information on said beam groups to be transmitted to said access point.

According to some embodiments, the apparatus is configured to cause preference information to be provided to said access point indicating which of said groups is to be preferentially used.

According to some embodiments, said apparatus is configured to receive using p-n groups at a time where p is the number of groups and n is less than p, causing information to be provided to said access point indicating which p-n of the groups is to be used.

According to some embodiments, the apparatus is configured to receive from said access point using at least one but not all of said groups and subsequently receiving from said access point using a different one or more of said groups.

According to some embodiments, the apparatus is configured to, after one or more groups have been defined, if for a current group, one or more beams are different, cause a request to be transmitted to said access point requesting said access point to transmit reference signals.

According to some embodiments the apparatus is configured to perform said measurements with respect to beam specific reference signals of respective transmit beam directions.

According to some embodiments, said performing comprises said apparatus performing beam quality measurements.

According to some embodiments, the apparatus comprises means for obtaining respective identity information from one or more transmitted beams.

According to some embodiments, the respective identity information comprises a respective beam specific reference signal.

According to some embodiments, said information comprises one or more of beam quality information and beam identity information.

According to some embodiments, said apparatus is configured to receive said at least one transmit beam in a plurality of sweep blocks.

According to some embodiments, the identity information comprises sweep block information.

According to some embodiments, the apparatus is configured to cause said information on said at least one beam group to be provided in response to an event.

According to some embodiments, the apparatus is configured to receive a request from said access point and in response to said request, cause said information to be transmitted to said access point.

According to some embodiments, said apparatus is configured to transmit said information on the plurality of groups separately.

According to some embodiments, said apparatus is configured to transmit said information on the plurality of groups together.

According to some embodiments, at least one group comprises two or more receive beams.

According to some embodiments, at least one group comprises two or more transmit beams.

According to some embodiments, the apparatus is configured to use said plurality of beam groups to determine which receive beam direction(s) of said access point and transmit beam direction(s) of said user device to use.

In an eighth aspect there is provided an apparatus comprising: at least one processor; and at least one memory including computer program code; the at least one memory and the computer program code configured to, with the at least one processor, cause the apparatus at least to: receive information at an access point from a user device about a plurality of beam groups, each beam group associating at least one receive beam direction of the user device and at one transmit beam direction of the access point; and use information on said beam groups to control which transmit beam(s) are to be used to transmit to said user device.

According to some embodiments, the apparatus is configured to use preference information indicating which of said groups is to be preferentially used.

According to some embodiments, the apparatus is configured to receive a reference signal transmission request for one or more beam directions and in response thereto cause the transmission of said reference signal in said one or more beam directions.

According to some embodiments, the apparatus is configured to transmit to said user equipment using p-n groups at a time where p is the number of groups and n is less than p, wherein said preference information indicates which p-n of the groups is to be used.

According to some embodiments, the apparatus is configured to determine a failure condition associated with one or more of said groups and in response thereto use a different one or more of said groups.

According to some embodiments, the apparatus is configured to transmit said at least one transmit beam in a plurality of sweep blocks to said user device.

According to some embodiments, the apparatus is configured to cause a request to be sent from said access point to the user device and in response to said request, receive said information on said at least one beam group from said user device.

According to some embodiments, at least one group comprises two or more receive beams.

According to some embodiments, said at least one group comprises two or more transmit beams.

In a ninth aspect there is provided an apparatus comprising means for performing one or more measurements in a user device to determine a plurality of beam groups, each beam group associating at least one receive beam direction of a user device and at least one transmit beam direction of an access point; and means for causing information on said beam groups to be transmitted to said access point.

According to some embodiments, the apparatus comprises means for causing preference information to be provided to said access point indicating which of said groups is to be preferentially used.

According to some embodiments, said apparatus comprises means for receiving using p-n groups at a time where p is the number of groups and n is less than p, and means for causing information to be provided to said access point indicating which p-n of the groups is to be used.

According to some embodiments, the apparatus comprises means for receiving from said access point using at least one but not all of said groups and subsequently receiving from said access point using a different one or more of said groups.

According to some embodiments, the apparatus comprises means for, after one or more groups have been defined, if for a current group, one or more beams are different, causing a request to be transmitted to said access point requesting said access point to transmit reference signals.

According to some embodiments the apparatus comprises means for performing said measurements with respect to beam specific reference signals of respective transmit beam directions.

According to some embodiments, said performing comprises said apparatus performing beam quality measurements.

According to some embodiments, the apparatus comprises means for obtaining respective identity information from one or more transmitted beams.

According to some embodiments, the respective identity information comprises a respective beam specific reference signal.

According to some embodiments, said information comprises one or more of beam quality information and beam identity information.

According to some embodiments, said apparatus comprises means for receiving said at least one transmit beam in a plurality of sweep blocks.

According to some embodiments, the identity information comprises sweep block information.

According to some embodiments, the apparatus comprises means for causing said information on said at least one beam group to be provided in response to an event.

According to some embodiments, the apparatus comprises means for receiving a request from said access point and in response to said request, causing said information to be transmitted to said access point.

According to some embodiments, said apparatus comprises means for transmitting said information on the plurality of groups separately.

According to some embodiments, said apparatus comprises means for transmitting said information on the plurality of groups together.

According to some embodiments, at least one group comprises two or more receive beams.

According to some embodiments, at least one group comprises two or more transmit beams.

According to some embodiments, the apparatus comprises means for using said plurality of beam groups to determine which receive beam direction(s) of said access point and transmit beam direction(s) of said user device to use.

In a tenth aspect there is provided an apparatus comprising means for receiving information at an access point from a user device about a plurality of beam groups, each beam group associating at least one receive beam direction of the user device and at one transmit beam direction of the access point; and means for using information on said beam groups to control which transmit beam(s) are to be used to transmit to said user device.

According to some embodiments, the apparatus comprises means for using preference information indicating which of said groups is to be preferentially used.

According to some embodiments, the apparatus comprises means for receiving a reference signal transmission request for one or more beam directions and in response thereto cause the transmission of said reference signal in said one or more beam directions.

According to some embodiments, the apparatus comprises means for transmitting to said user equipment using p-n groups at a time where p is the number of groups and n is less than p, wherein said preference information indicates which p-n of the groups is to be used.

According to some embodiments, the apparatus comprises means for determining a failure condition associated with one or more of said groups and in response thereto use a different one or more of said groups.

According to some embodiments, the apparatus comprises means for transmitting said at least one transmit beam in a plurality of sweep blocks to said user device.

According to some embodiments, the apparatus comprises means for causing a request to be sent from said access point to the user device and in response to said request, receive said information on said at least one beam group from said user device.

According to some embodiments, at least one group comprises two or more receive beams.

According to some embodiments, said at least one group comprises two or more transmit beams.

BRIEF DESCRIPTION OF THE FIGURES

Embodiments will now be described, by way of example only, with reference to the accompanying Figures in which.

DETAILED DESCRIPTION OF THE FIGURES

In the following certain exemplifying embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1 to 2 to assist in understanding the technology underlying the described examples.

A communication device 10 or terminal can be provided wireless access via base stations or similar wireless transmitter and/or receiver nodes providing access points of a radio access system.

Each of the access points may provide at least one antenna beam directed in the direction of the communication device 10 at a given time. In some embodiments a plurality of beams may be directed at a communication device. The antenna beam can be provided by appropriate elements of antenna arrays of the access points. For example, access links between the access points (AP) and a user equipment (UE) can be provided by active antenna arrays. Such arrays can dynamically form and steer narrow transmission/reception beams and thus serve UEs and track their positions. This is known as user equipment-specific beamforming. The active antenna arrays can be used both at the access point and at the user equipment device to further enhance the beamforming potential. More than one beam can be provided by each access point and/or antenna array.

Figure 1:
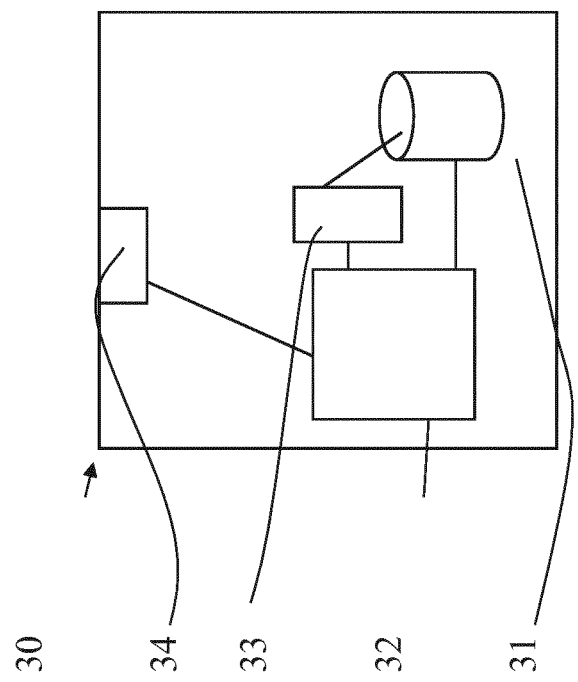
FIG. 1 shows a schematic diagram of a control apparatus according to some embodiments.

Access points and hence communications there through are typically controlled by at least one appropriate controller apparatus so as to enable operation thereof and management of mobile communication devices in communication therewith. FIG. 1 shows an example of a control apparatus for a node, for example to be integrated with, coupled to and/or otherwise for controlling any of the access points. The control apparatus 30 can be arranged to provide control on communications via antenna beams by the access points and on operations such as handovers between the access points. For this purpose the control apparatus comprises at least one memory 31, at least one data processing unit 32, 33 and an input/output interface 34. Via the interface the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions may be distributed between several control units. In some embodiments, each base station can comprise a control apparatus. In alternative embodiments, two or more base stations may share a control apparatus.

Access points and associated controllers may communicate with each other via fixed line connection and/or radio interface. The logical connection between the base station nodes can be provided for example by an X2 interface. This interface can be used for example for coordination of operation of the stations.

The communication device or user equipment (UE) 10 may comprise any suitable device capable of at least receiving wireless communication of data. For example, the device can be handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewelry and so on, universal serial bus (USB) sticks with wireless capabilities, modem data cards, machine type devices or any combinations of these or the like.

Figure 2:
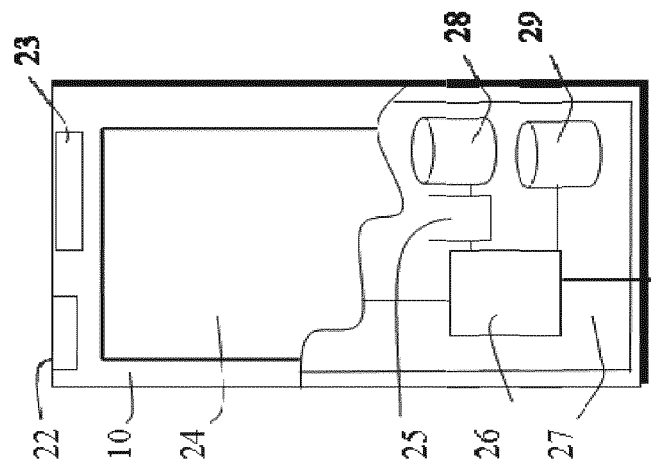
FIG. 2 shows a schematic presentation of a possible communication device.

FIG. 2 shows a schematic, partially sectioned view of a possible communication device. More particularly, a handheld or otherwise mobile communication device (or user equipment UE) 10 is shown. A mobile communication device is provided with wireless communication capabilities and appropriate electronic control apparatus for enabling operation thereof. Thus the mobile device 10 is shown being provided with at least one data processing entity 26, for example a central processing unit and/or a core processor, at least one memory 28 and other possible components such as additional processors 25 and memories 29 for use in software and hardware aided execution of tasks it is designed to perform. The data processing, storage and other relevant control apparatus can be provided on an appropriate circuit board 27 and/or in chipsets. Data processing and memory functions provided by the control apparatus of the mobile device are configured to cause control and signalling operations in accordance with certain embodiments of the present invention as described later in this description. A user may control the operation of the mobile device by means of a suitable user interface such as touch sensitive display screen or pad 24 and/or a key pad, one of more actuator buttons 22, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The mobile device may communicate wirelessly via appropriate apparatus for receiving and transmitting signals. FIG. 2 shows schematically a radio block 23 connected to the control apparatus of the device. The radio block can comprise a radio part and associated antenna arrangement. The antenna arrangement may be arranged internally or externally to the mobile device. The antenna arrangement may comprise elements capable of beamforming operations.

Some embodiments relate to mobile communication networks with beamforming techniques. For example, 5G radio access technology and LTE-A (Long term evolution-advanced) evolution have proposed using beamforming techniques. It should be appreciated that other embodiments may be used with any other communication system which uses beamforming. For example some wireless area networks may use beamforming.

The 5G radio system may use frequencies form 400 MHz to 100 GHz. Beamforming is considered to be desirable in enabling the use of the higher frequency bands due to coverage issues.

Some transceivers (e.g. a hybrid transceiver architecture) may use analogue beamforming, which may mean a limited number of concurrent beams as this is dependent on the number of antenna ports. It should be appreciated that other embodiments may be used with digital beamforming transceiver architecture or so-called hybrid transceiver architecture which use a hybrid of digital baseband processing (such as MIMO Multiple Input Multiple Output, and/or digital precoding) and analogue beamforming. It should be appreciated that embodiments can be used with any method of beamforming.

Figure 3:
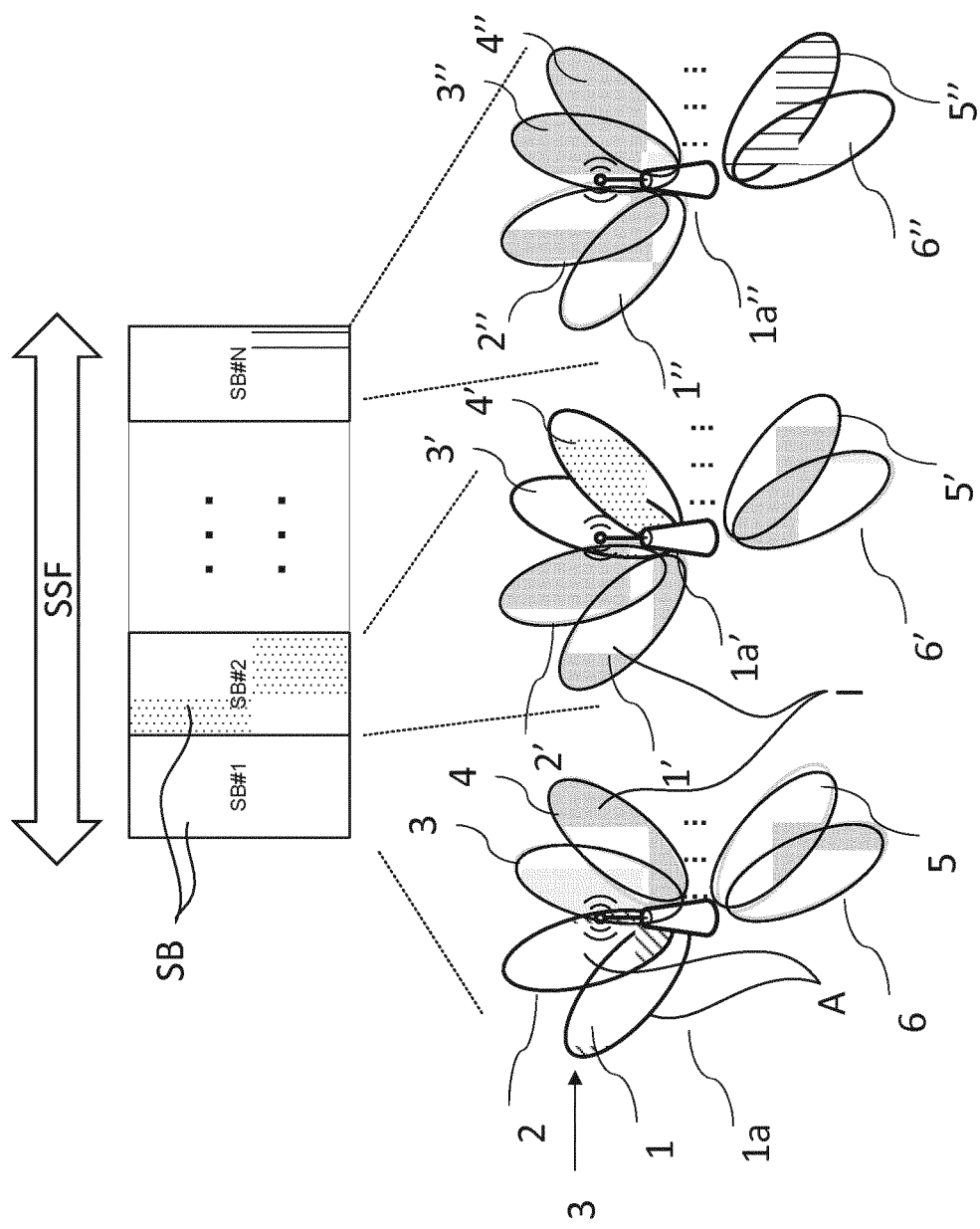
FIG. 3 shows a schematic diagram of a sweeping subframe.

Reference is made to FIG. 3 which shows an access points configured with a sweeping sub-frame The access point is shown changing the beams in time, at a first point in time it is denoted as 1a, at a second point in time as 1a' and at a third point in time as 1a". The access point may be a base station. In some standards, such as 5G, the access point may be referred to as a BS (Base station). The access point has a cell coverage area generally denoted by the reference numeral 3. The cell coverage area is covered by beams defined by the access node. In the example shown in FIG. 3, six beams are shown for the access points. These are beam 1, 1', 1", beam 2, 2', 2" beam 3, 3', 3", beam 4, 4', 4", beam 5, 5', 5" and beam 6, 6', 6". At each time instance, the access point has two active beams in a sweeping block (SB) Consecutive sweeping blocks are transmitted by the base station, each sweeping block consisting of different beams compared to other sweeping blocks. Beam 1 and beam 2 are active at first time instance in the sweeping block 1, beam 3' and beam 4' are active for the second sweeping block 2, and beam 5" and beam 6" are active for the third sweeping block N. During a sweeping block, only some of the beams are active, the rest of the beams are inactive. It should be appreciated that in different embodiments, more or less than six beams may be provided.

In the example above, there are three sweeping blocks. However in other embodiments, the number of sweeping blocks required to sweep all the beams may be more or less than equal to three. The number of beams in a sweeping block may be more or less than 2.

In some embodiments the number of active and inactive beams provided may also vary over time. The number of active beams may vary between the access points.

To enable system access, periodical transmission of system information may be required per direction where one or more beams cover a specific area of a cell. The corresponding directions may need to be covered to provide resources for system access. When an access point covers a specific area with a set of beams during a time interval (such as symbol duration or two symbol durations) it is called a sweep block. FIG. 3 illustrates the concept of sweep blocks: For sweep block SB #2 the beams 3' and 4' are active and for sweep block SB # N the beams 5" and 6" are active. Although FIG. 3 illustrates that adjacent beams are active during sweep block it should be understood that a different set of beams may be selected for a given sweep block. Active beams are referenced A in FIG. 3 and inactive beams are referenced I.

FIG. 3 further depicts a sweeping sub-frame SSF. The sweeping sub frame may provide coverage for common control channel signalling with beamforming. The sweeping sub-frame consists of sweeping blocks SB.

The total number of beams required to cover the required cell area may be larger than the number of concurrent active beams that the access point is able to form. Therefore access points need to sweep through the cell coverage area in the time domain by activating a different set of beams on each sweep block. Depending on the number of active beams per sweep block and on the total number of beams required to cover a cell area, two or more sweep blocks may be required. Furthermore, the number of sweep blocks per sub frame is limited by the length of each sweep. As an example, one sweep block duration may be one or two symbols (for example, OFDM (orthogonal frequency-division multiplexing) symbols) and if there are 14 symbols per sub frame, the sweeping sub frame would be able to accommodate 7 or 14 sweep blocks. Depending on the number of sweep blocks required to cover a cell, a plurality of sweeping sub-frames may be needed. However, this is by way of example only and different configurations may be used in different embodiments.

The active beams depicted in FIG. 3 may be used for either transmitting or receiving information. The sweeping sub frame can therefore be defined as a downlink sweeping sub frame, when the active beam is transmitting information, or as an uplink sweeping sub frame, when the active beam is receiving information. Furthermore, assuming a TDD (time division duplex) system and reciprocity between downlink and uplink channels, to cover a cell area on the uplink and the downlink directions with the same beam configurations per sweep block, the same sweep blocks need to be defined on uplink and downlink direction.

As an example of downlink direction, if downlink common control channel coverage is provided by the sweeping sub frame, each sweep block may carry cell access information such as one or more of downlink synchronization signals, system information such as MIB (master information block), SIB (system information block) or the like.

Other examples or information which may be include alternatively or additionally comprise one or more of, PRACH/RACH (physical random access channel and random access channel configurations), paging, and any control information that needs to be broadcasted in a cell. In the uplink direction, the sweeping sub frame/sub frames may accommodate resources for the random access channel or other uplink channels requiring periodic availability such as SR (scheduling request).

A non-limiting definition for a beam is a detection of a beam specific reference signal (BRS). In one example, a beam specific reference signal S is mapped to an antenna port which maps to at least one, typically a plurality of, antenna elements. The signals leading to the antenna elements are individually weighted (depending on architecture this may be analogue or digital weighting), to form a specific radiation pattern.

Multiple antenna ports may be defined (thus multiple radiation patterns may be formed) which are identified by detection of different beam specific reference signals. These radiation patterns may be equally shaped but may point in different directions.

A single beam specific reference signal may be mapped to two or more antenna ports which may or may not map to the same antenna elements. In some embodiments, antenna elements can be mapped dynamically to different ports. One example is to transmit a beam specific reference signal using two antenna ports where the antenna element specific weights are equal, but the first antenna port maps to elements that are horizontally polarized (H-polarization) and second antenna port maps to elements which are vertically polarized (V-polarization). Thus the radiation patterns of the elements of the first and second ports are the same but as same beam specific reference signal is transmitted through both ports they are observed as a single beam. In some embodiments, a beam specific reference signal may be transmitted on two or more ports where the antenna element specific weighting is not equal (different radiation patterns).

In a beam formed system where the cell coverage is provided by multiple beams, it may be beneficial to identify a single beam e.g. by using beam specific reference signals enabling user equipment to perform beam level detection/separation and perform measurements on beam specific reference signal. The measurements may determine indicators such as, but limited do, one or more of Reference Signal Received Power (RSRP), Reference Signal Received Quality (RSRQ), received signal strength indicator (RSSI)), channel quality indicator (CQI) or the like. Identifying different beams may be beneficial e.g. when user equipment indicates to the network access point the preferred communication beam during initial access or mapping a measurement to a common reference index when reporting the measurements to the network access point.

To identify a beam, the following mappings can be made: e.g. if eight different beam reference signals are transmitted per sweep block, the receiver is potentially able to measure eight different signal indices (beams or beam indices). The eight different BRS signals are corresponding to eight antenna ports. The same beam specific reference signal antenna ports may be reused in the next sweep block, thus the sweep block ID may need to be determined to be able to determine the beam index. Thus the beam index may be calculated by:

Beam index=BRS antenna port*Sweep block index

The sweep block index may be explicitly signalled if the sweep block (sweep symbol or multiple symbols) convey also one or more of information such as MIB, SIB, DL CTRL (downlink control), DL DATA (downlink data) and/or the like. Alternatively or additionally, the sweep block may include a specific sequence number to identify the block.

To achieve sufficient coverage and capacity in a cellular network, propagation/path loss of the radio channel at high carrier frequencies, e.g. 28 GHz or similar frequencies, may be compensated by introducing directive transmission and reception in the form of beamforming, e.g. via large scale antenna arrays. As a result of this, relatively large antenna array gains, at both the access point, (e.g. 18 dB with 64 antenna elements) and the user equipment (e.g. 9 dB with 8 antenna elements) may be achieved to compensate propagation loss and/or losses for example due to rain and oxygen absorption. Different embodiments may of course operate at different frequencies.

Figure 4:
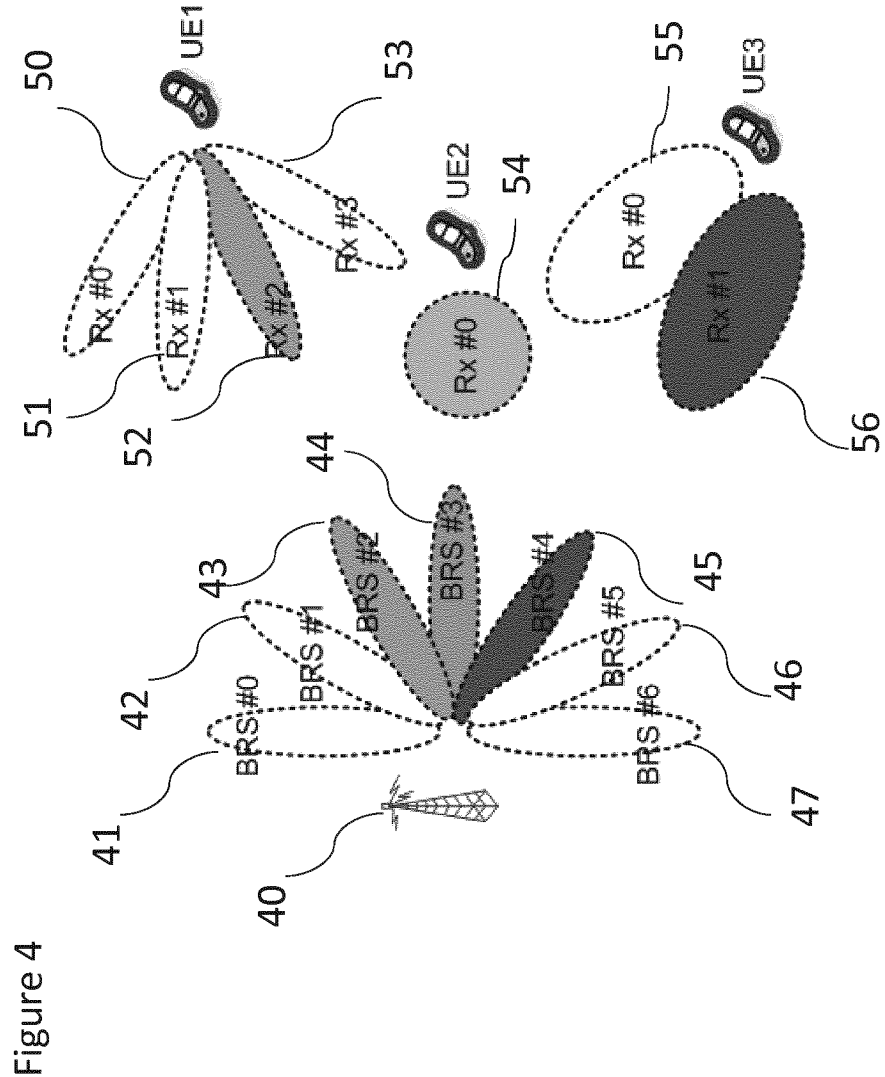
FIG. 4 shows a schematic diagram of a base station and three user equipment devices.

Reference is made to FIG. 4 which illustrates that both user equipment and network (access point) beamforming may be used. FIG. 4 shows an access point 40, and three user equipment devices UE1, UE2, UE3. The access point beams, 41-47, and user equipment beams 50-56 of UE1, UE2 and UE3 are also schematically illustrated. Each user equipment is shown to have a different receiving beam resolutions Rx by way of example.

As described above, access point coverage is provided by forming a set of beams that cover a part of the cell area, thus the user equipment may detect a plurality of beams as the radiation patterns of different beams typically overlap to provide solid coverage (FIG. 4 illustrates a simplified view).

Depending on the user equipment's communication beam direction, a different beam, or set of beams may be detected. In addition to this, the case of an omnidirectional beam should also be discussed. As a narrow beam illustrates higher antenna gain (obtained by using a plurality of elements, weighted accordingly to point the main lobe), the omnidirectional beam has equal antenna gain to all directions. Thus the user equipment is able to detect signals from all directions (also interference) but with lower antenna gain.

UE1 operates with four receiving beams 50-54 and matches receiving beam 52 with the access point transmitting beam 43, as illustrated by means of matching shading in FIG. 4.

UE2 is an omnidirectional user equipment for which the best downlink beam is access point beam 44.

UE3 is operating only two receiving beams, 55, 56, and matches beam 56 with the access point beam 45.

When a user equipment performs, for example, beam specific reference signal measurements to detect access point communication beams (using user equipment beamforming) it may need to steer/form its receiving beam to a plurality of directions to determine the best communication beam/direction i.e. to determine which receiving beam provides the highest quality measurements or similar parameter. The highest quality may be determined either by signal level, by number of detected beams above a certain threshold and/or the like. As the beam coverage areas overlap, the user equipment may detect a plurality of access point beams per its own receiving beam direction and/or due to the radio environment (reflections from objects/surfaces).

In addition to this, the user equipment may detect different access point communication beams by pointing the receiving beam to different directions. This is illustrated in FIG. 5.

Figure 5:
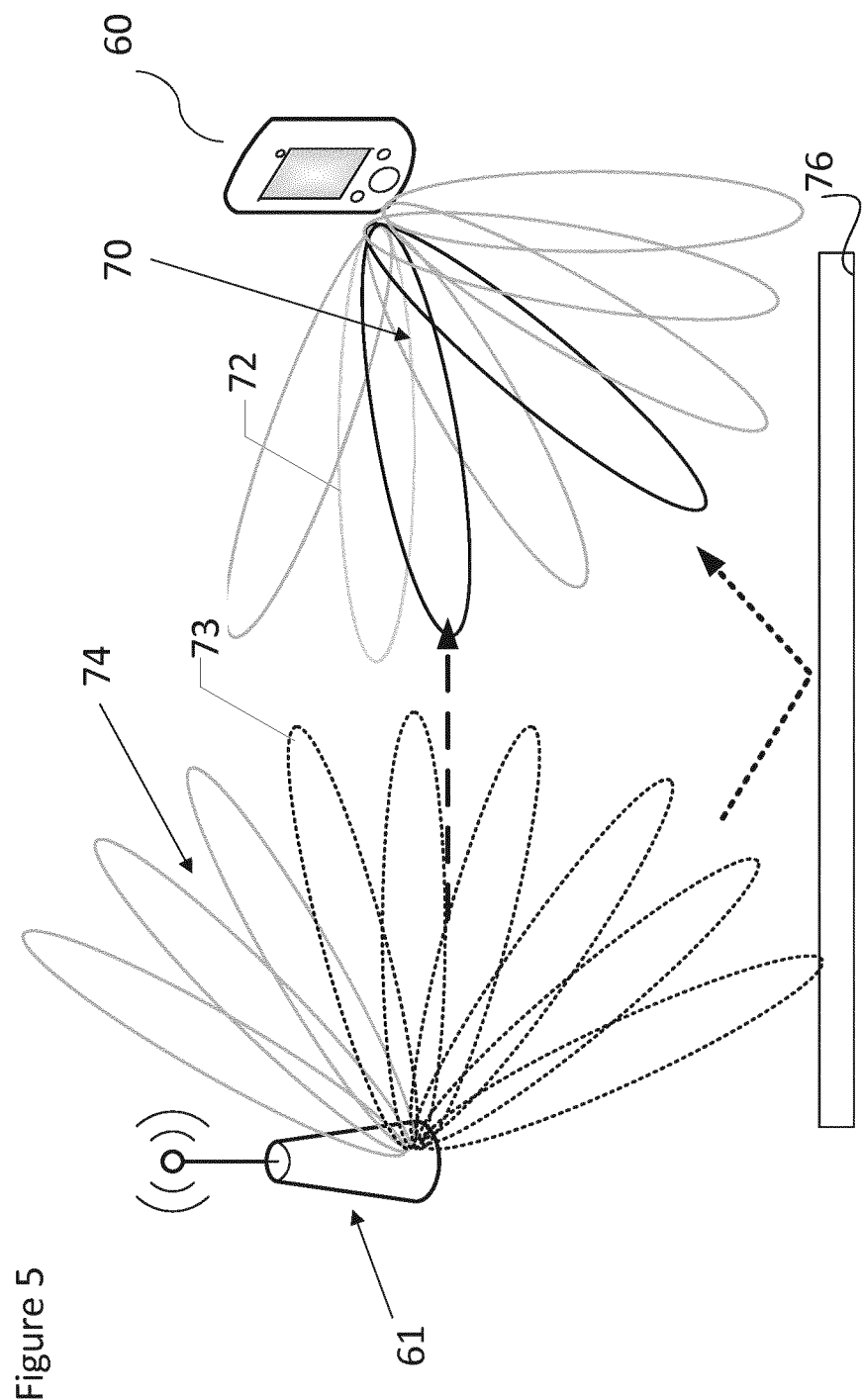
FIG. 5 shows a schematic diagram of a network and user device beamforming.

The user equipment 60 is able to point its receiving beam 70 to different directions, or alternatively it may be able to form a plurality of simultaneous beams to cover different directions (by way of a non-limiting example, FIG. 5 depicts two receiver beams). The receiver beams may receive the signals transmitted from the access point directly and/or reflect off an object 76. The gray lined beams 72 illustrate the potential directions the user equipment is able to cover by beamforming. The access point 61 and access point-beams 73 are depicted in an analogous manner. The gray lined beams 74 are the inactive beam directions.

Figure 6:
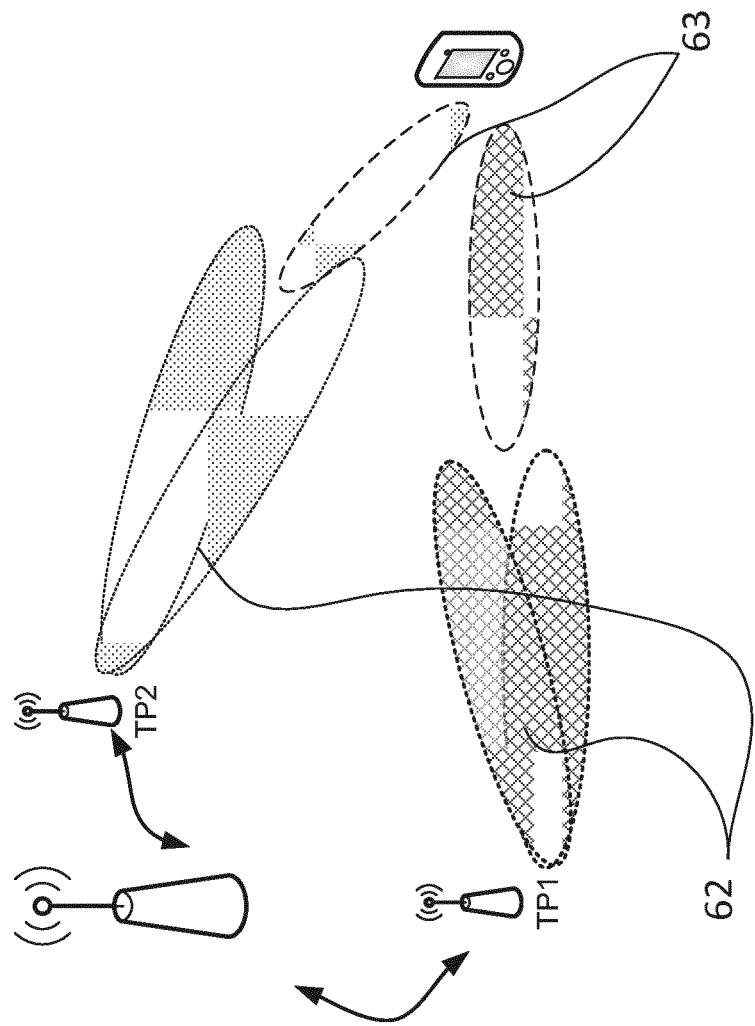
FIG. 6 shows a schematic diagram of network-beamforming in a deployment scenario of two transmission points.

Reference is made to FIG. 6 which shows an example where a cell is deployed by using two or more transmission points (TP1 and TP2). From a network and a user equipment perspective the operation is similar to the operation if the different transmission points were acting as a single cell, but a larger area is covered by locating the transmission points potentially to different physical location. The transmission points provide downlink beams 62 and the UE has receive beams 63.

To exploit the full merit of large scale antenna arrays, such as phased antenna array technology, directivity at transmitter and receiver need to be dynamically adjusted according to a deployment scenario and potential changes in a radio link between transmitter and receiver. In practice, especially in cellular networks with multiple access points and users, this may lead to excessive amount of system overheads related to beamformer training, beam tracking and beam switching at the user equipment and associated signaling needs between access point and user equipment (e.g. a beam report providing beam specific reference signal measurements or carrying CSI (channel state information).

From a network perspective the more information (detected beams) the user equipment provides, the more flexibility it gives. The network may form a limited number of communication beams concurrently (typically e.g. 2, 4, 8) and communicate only with the user equipment devices on those beams. This may lead to inefficient use of frequency/time resources. This is because if more user equipment devices could be served per beam direction, the scheduler will have more freedom to perform scheduling decisions and utilize resources more efficiently. In one example, the user equipment device could have been served by using another alternative detected beam (with potentially lower quality due to user equipment receiving beam alignment or radio conditions with respective to the selected beam but still sufficient) during a specific TTI (transmission time interval).

The user equipment may detect two or more downlink transmitted beams. The beams may be from different Rx directions. The user equipment device may report the detected beams. Both the user equipment receiver and transmitter beams and the access point-beam needs to be aligned when transmitting or receiving. However, there may be uncertainty, especially in failure cases as to how to reach the user equipment device due to receiver beam alignment issues.

According to some embodiments, a feedback signalling method may be employed to enable transmitter and receiver beam management for base stations and user equipment devices. The base station and user equipment may use beamforming techniques. The base station and/or the user equipment device may be equipped with analogue/hybrid antenna array architectures.

According to some embodiments, the user equipment performs measurements to detect linkage between the network (downlink) communication beams per its own receiver beam direction based on beam specific reference signals (BRS) and/or other downlink reference signals.

In one example embodiment, the method may determine the user equipment receiver/transmitter beamforming linkage with respect to the transmitted downlink beams. Where at least two different receiver beam directions are linked with downlink communication beams, a beam group may be formed per a set of receiver beam directions. The set may comprise one or more receiver beam directions.

In some embodiments, the linkage may be signalled to the network. Upon request by a network, or upon an event trigger, the method may generate a report including an indication of existence of at least one beam groups at the user equipment. In some embodiments, the access point will be provided with information when a first group is defined. Information about further groups may be provided later. Alternatively information about two or more groups may be provided together. In some embodiments only one group may be defined whilst in other embodiments, more than one group is provided.

The report may be a measurement report or a beam report including beam qualities. The beam qualities may be one or more qualities such as, but not limited to, Reference Signal Received Quality, Reference Signal Received Power, index or group ID per detected set of beams with quality above threshold, and N-best beam associated with each group. The beam report may then be provided it to network access point.

Maintaining the beam group per a set of receiver beams direction may involve updating the beams belonging to a certain group. In other words, the linkage may need to be updated from time to time.

Some embodiments may also involve indicating by group basis the user equipment capability to detect/monitor transmissions from multiple groups. The user equipment may indicate the preferred beam group in case it is not able to receive with multiple receiver beams at the same time. Alternatively the preferred beam group may be selected for user equipment by the access point based on indicated values.

Additionally or alternatively, in some embodiments the user equipment may indicate its capability to be able to receive with two or more receive beam directions concurrently by indicating in the measurement report that the group is "monitored"

The feedback signalling scheme may be based on periodic and/or aperiodic reference signals that enable efficient transmitter and receiver beam management in a wireless system for co-located and non-co-located antenna deployments.

Feedback signaling scheme may also capture several beam index group measurements from transmitted reference signals such as, by way of a non-limiting example, beam specific reference signal, and enable a user equipment device to send single or a plurality of feedback reports via uplink control or data channels. By way of a non-limiting example, this may include L1 or L2/L3 feedback such as MAC (medium access control) or RRC) (radio resource control) signalling.

The user equipment device may performs P different beam index group measurements from reference signals. The reference signals may be used for user-plane and/or control-plane operations, such as operations associated with beam measurements/CSI computation/demodulation.

The beam index group measurements may, by way of example, include beam specific reference signal measurements for each beam.

The parameter P may be a user equipment device-specific parameter. This parameter may be configured by a network. This may be done with higher layer signalling. The parameter may alternatively be configured in the user equipment device.

In other embodiments, the parameter P may be specific to the cell or network.

Each of the P different beam index group measurements may correspond to a different receiver beam space configuration. Each receiver beam space configuration may be defined by different receiver antenna port and beam configurations at a user equipment device.

The base station or access point may separately configure for the user equipment, the subset of antenna ports associated with a reference signal to be measured by the user equipment and reported by the user equipment device. The reference signal is provided in a respective beam transmitted by the access point.

For each of P different beam index group, the N-best downlink transmitter logical beam indices associated with reference signal antenna ports, such as the beam specific reference signal, may be reported. This reporting may be independent of whether the antennas are co-located or not co-located. The N-best logical downlink beam indices may be determined according to the RSRP/RSRQ measurements on aforementioned antenna ports.

The parameter N may be a device specific parameter. The parameter may be configured by a network with higher layer signalling. Alternatively the parameter P may be configured by the UE. The parameter may alternatively by specific to the cell or network.

The user equipment device may send a periodic/aperiodic feedback report via an uplink control channel. By way of a non-limiting example, the channel may be physical uplink control channel (PUCCH). This channel may be referred to a xPUCCH in the proposed 5G system.

The feedback report may be sent in a sub-frame n+k upon decoding in sub-frame n regarding the P different beam index groups. The feedback report may alternatively or additionally comprise the N-best TX beam indices and/or corresponding quantized Reference Signal Received Power-levels associated with each beam index set or the like.

The beam index group feedback may be sent as a single joint beam index group report covering all P different beam index groups or as P separate beam index group reports.

The report or report may be sent by the user equipment via uplink control or data channels (for example using L1 or L2/L3 feedback such as MAC or RRC signaling).

The user equipment device may send an aperiodic feedback report multiplexed with data. By way of a non-limiting example, this may be via the physical uplink shared channel (PUSCH) regarding one or more of: P different beam index sets, N-best transmitter beam indices, and quantized Reference Signal Received Power/Reference Signal Received Quality-levels associated with each beam index group.

The user equipment device may send an aperiodic feedback report as a part of data, (such as a physical uplink shared channel (PUSCH) in MAC message) to a base station on P different beam index sets in conjunction with N-best transmitter beam indices as well as corresponding quantized RSRP-levels associated with each beam index set. The physical uplink shared channel may be referred to a xPUSCH in the proposed 5G system.

The base station or access point may have freedom to configure a feedback reporting mode to be either periodic or aperiodic. Alternatively this may be set on a cell or network base. In some embodiments, this may be controlled by the UE.

In some embodiments, the UE may determine that one or more of the beam groups is no longer appropriate. In response to this determination, the UE may transmit information to the BS to trigger transmission by the BS of beam refinement reference signal.

In some embodiments, one or more groups have already been defined. If in a latest grouping the beams are different, than the UE will sent a request to the access point to trigger BRRS transmission. In some embodiments, if a beam index which previously in a group, is now in a different group, this triggers RS.

Some embodiments may comprise grouping the measured beams according to the used beamformer, comparing the mean in each group with the beams existing in one or more previous computed groups, causing a request for reference signals transmission to be transmitted if same beam indexes part of received groups at previous step are not part of different receive group.

In some embodiments, there may be group based resources configured for the UE to transmit a trigger signal to start a group maintenance procedure. In the procedure, BS may transmit a signal in repetitious manner using beam(s) of the group the trigger signal is associated to enable UE to try and train its RX beams towards the respective group.

In some embodiments, when the user equipment it is not able to receive with multiple receiver beams simultaneously, it may be able to indicate the preferred beam group. Alternatively, in some exemplary embodiments the group which it to be used may be selected by the network based on indicated values.

In one embodiment, the network may indicate, in the currently active beam group, that the group for next downlink (and/or uplink) allocation will change. This may be indicated, by way of a non-limiting example, in the downlink control information in the downlink assignment, when the downlink control information in the uplink grant is scheduled or by a MAC CE or via radio resource control (RRC) signalling.

In some embodiments, the network may also indicate the time when the change takes place, which may be subject to the user equipment device capability to change the directions. The time could be expressed by sub frames or by radio frames etc.

Additionally or alternatively, in some embodiments, the user equipment device may indicate the ability to receive with multiple receiver beam directions concurrently by indicating that the respective group is "monitored" in the measurement report.

In one embodiment, if more beam groups are configured at the access point than the user equipment device can receive concurrently, then the user equipment and/or the network maintains the number of beam groups active at a given time to be equal to or less than the number of beam groups that the user equipment can receive concurrently.

In some embodiments, the user equipment may indicate its ability to use certain receiver beam directions or beam groups for transmitter beam directions or groups.

In some embodiments, a report indicating the user equipment power allocation of at least one beam group may be generated by the user equipment. This may happen upon request by a network, or because of an event trigger based on configuration.

The report may be a power headroom report generated for each beam group.

This report may be used for maintaining the power headroom per beam group having independent or common triggering conditions over the beam groups.

For user equipment devices capable of receiving only from one receiver direction at a time but configured with a plurality of beam groups/receiver directions, the throughput may be increased when multiple available directions can be used in the time domain by multiplexing data transmission with another user equipment device that needs to be served from other beams.

Some embodiments may enhance the awareness of different transceiver-receiver beam combinations both at the base station and at the user equipment device in both co-located and not co-located antenna deployments. As a result, efficient beam management, such as beam training, tracking and switching, may be enabled in a cellular network type of operation.

The proposed methods minimize/avoid the usage of dedicated reference signals, such the system is enabled to operate more efficiently in terms of overheads and latencies.

Some embodiments may facilitate a transparent way for a base station to configure and manage different user/device specific transceiver-receiver beam combinations without the need to explicitly signal receiver antenna port indices to a base station.

Embodiments may be used in co-located and/or non co-located antenna deployments.

Some embodiments may also be advantageous on the issue of failure recovery. Specifically, if the user equipment device indicates at least two groups, the network may employ fast recovery when a link between a beam group and the user equipment receiver/transmitter beam drops.

The network may detect a failure such as, by way of a non-limiting example, a discontinuous transmission on the uplink grant or missing feedback on downlink transmission.

In some embodiments the user equipment device may indicate multiple beam groups but can form only one receiver beam at a time. In case the "primary" link fails, the user equipment device may switch to an alternative group. The network may have the information on the groups and may thus try a link recovery.

Alternatively the user equipment device may perform a random access channel (RACH) procedure to indicate the preferred group by selecting one or more beams from the said group by having information on power headroom per beam group basis, the network may determine, by way of example, a suitable uplink grant size per beam group.

Regarding the network scheduling flexibility aspects of the some embodiments described above, the network may perform downlink control transmission by selecting a beam group (when the user equipment device has multiple receiver beams) and a beam providing best scheduling gain. The latter may be, by way of example, in terms of trunking efficiency per transmission time interval (TTI) (the access point may have limited number of concurrent beams so selecting beams in a manner that enables to serve e.g. maximum number of UEs in a given TTI rather than providing maximum per UE throughput). Thus more users can be served per TTI as the access point selects beams that can be used to reach more UEs. With limited number of directions, the AP may not be limited by the time-frequency resources but in some cases the limited number of directions/beams it can form The downlink control may indicate the downlink beam index for, by way of example, Physical Downlink Shared Channel (PDSCH) transmission, and the user equipment device may form receiver beam(s) based on the mapping.

Figure 7:
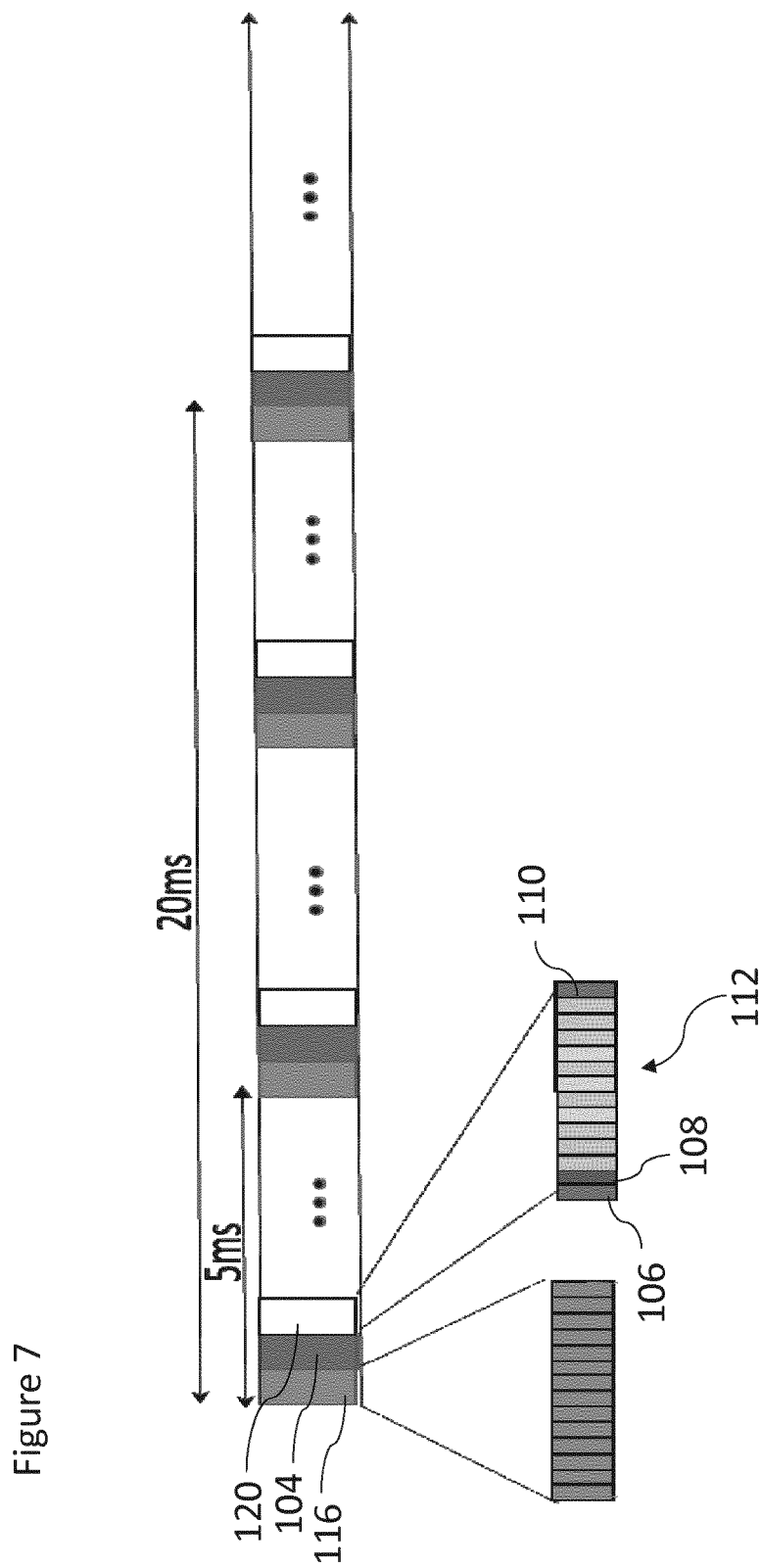
FIG. 7 shows a schematic diagram of an overview of frame structure.

With reference to FIG. 7, there is shown an overview of the frame structure and the positions of relevant downlink and uplink signals and channels. Each frame has a DL sweeping sub frame 116 with 14 OFDM symbols; SSS (secondary synchronisation signal), PSS (primary synchronisation signal), ESS (enhanced system selection) BRS, PBCH (physical broadcast channel) being provided in each symbol. The downlink transmission beams DL TX are associated with RS reference signal, for example the BRS, antenna ports from which the RSRP or similar measurements for P different beam groups are computed. This is followed by a UL sweeping sub frame 104. This is followed by a DL/UL sub frame 120. This has a first field 106 for DL CTRL information, a second field 108 for DMRS information, and 11 fields 112 for UL data, DL data and CSI-RS/SRS (sound reference signal). The last field 110 is for UL CTRL information. Based on RSRP or similar measurements, the UE sends a periodic or aperiodic single joint beam group report covering P different groups or separately P different beam group reports via UL control. The frame may have a 5 ms periodicity.

As shown, beam group measurements are performed from antenna ports associated with configured reference signal, e.g. beam specific reference signal. After this, a mobile device sends feedback report via uplink control, such as, by way of example, via the physical uplink control channel (PUCCH), on P different beam groups with N-best logical beam indices in conjunction with N-best Reference Signal Received Power/Reference Signal Received Quality (RSRP/RSRQ) levels in each group.

Figure 8:
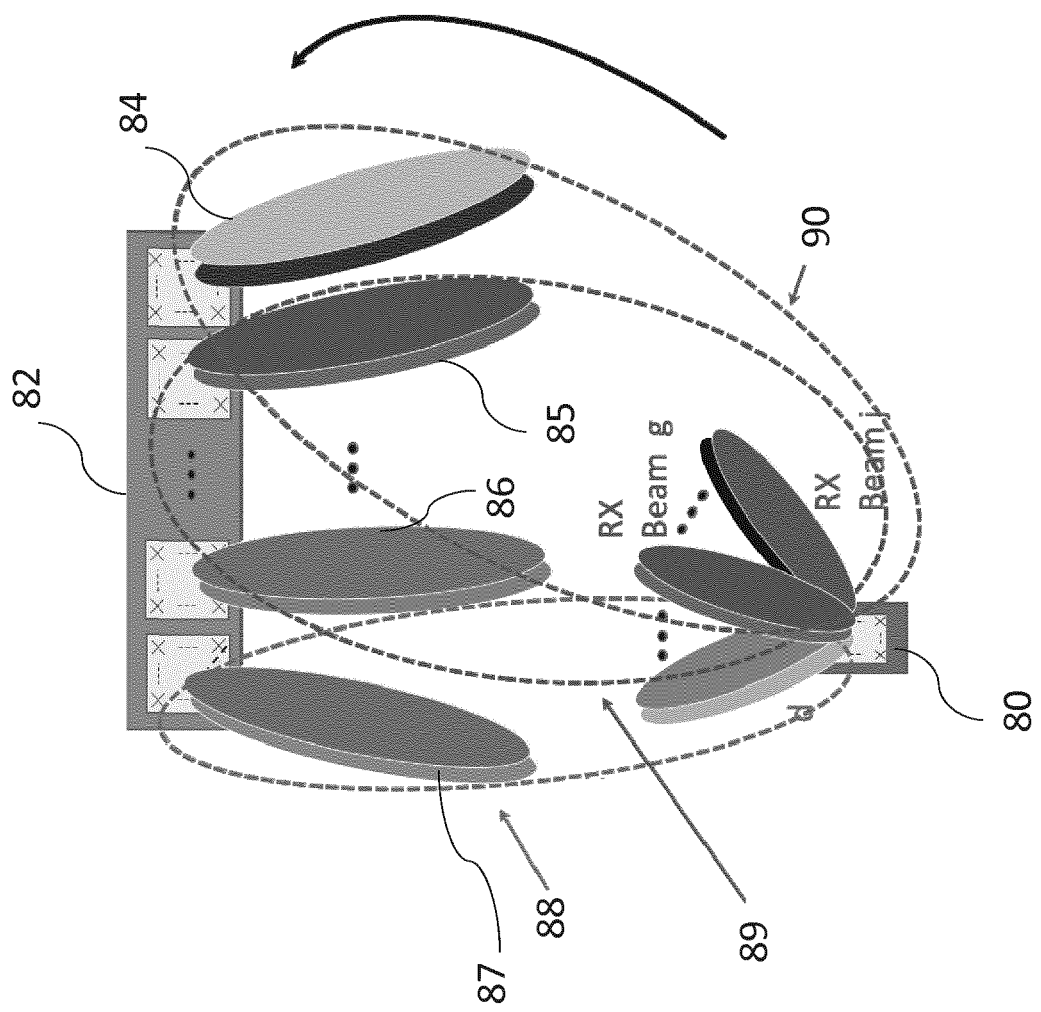
FIG. 8 shows a schematic diagram of beam grouping and feedback for not co-located antennas.

With reference to FIG. 8, there is shown an example of beam grouping and feedback for co-located antennas for a $k^{th}$ UE device 80.

The $k^{th}$ device 80 is shown to have three receiver beams, beam d, beam g and beam j. It can be appreciated that in different embodiments, more or less than three beams may be provided.

A base station 82 is shown to have four transmitter beams, 84, 85, 86, 87. It can be appreciated that in different embodiments, more or less than four beams may be provided. FIG. 8 also shows three different beam index groups, group d 88, group g 89 and group n. It can be appreciated that whilst FIG. 8 shows 3 groups, in different embodiments, more or less than three beam groups may be provided. Group d comprises the user equipment receiver beam set d and base station beam 87. Group d has two different logical downlink beam indices. Group g comprises the combination of user equipment receiver beams sets d, g and j and N base stations beams including beams 86 and 85. Each of the N beams has a different beam index. Finally, beam group n comprises the combination of user equipment receiver beams sets g and j and has n base station transmitter beams including beams 85 and 84.

Figure 9:
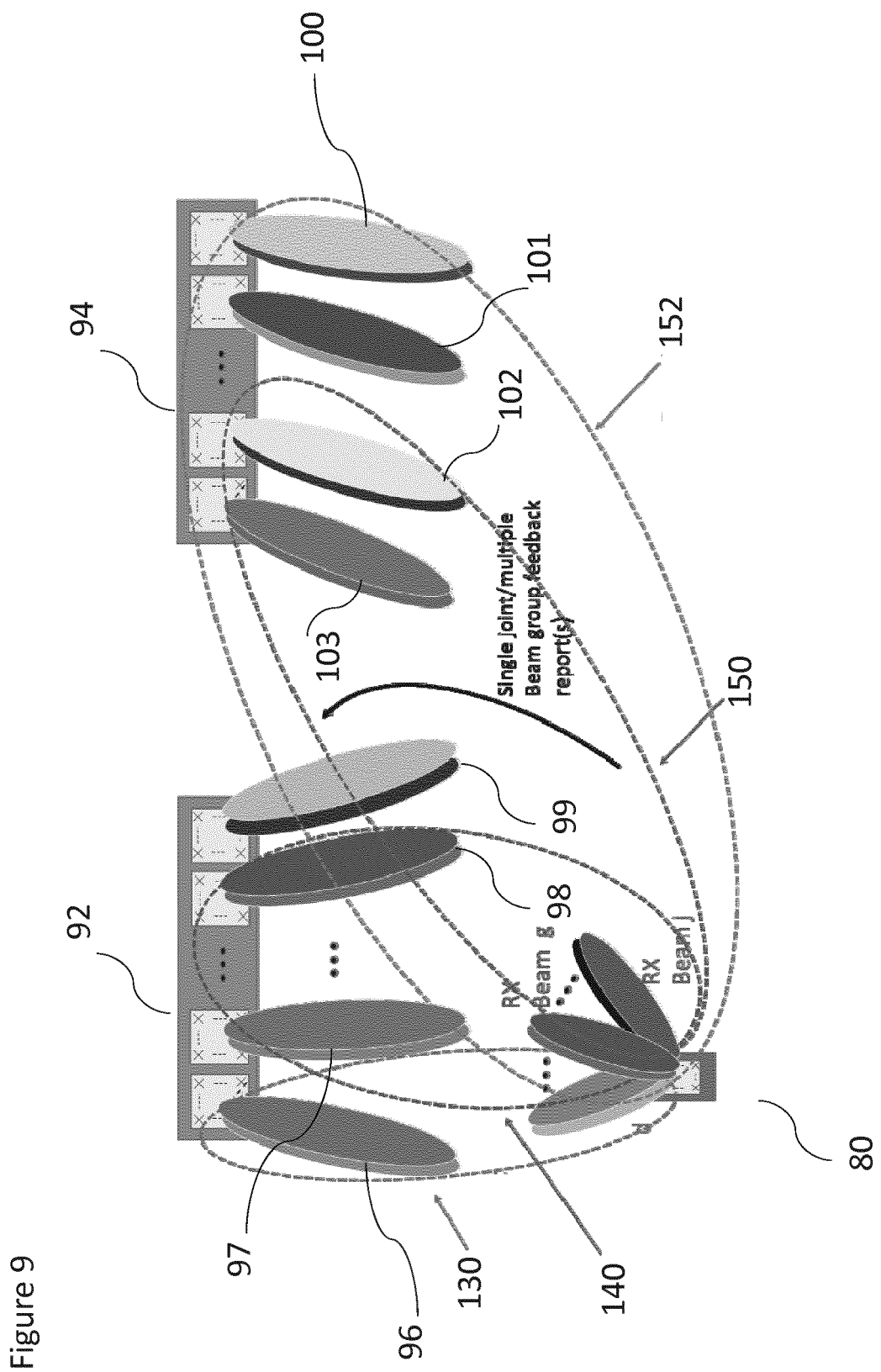
FIG. 9 shows a schematic diagram of beam grouping and feedback for co-located antennas.

With reference to FIG. 9, there is shown an example of beam grouping and feedback for non co-located antennas for a $k^{th}$ device 80.

The $k^{th}$ device 80 is shown to have three receiver beams, beam d, beam g and beam j. It can be appreciated that in different embodiments, more or less than three beams may be provided.

The transmission point 92 is shown to have four transmitter beams, 96, 97, 98, 99. It can be appreciated that in different embodiments, more or less than four beams may be provided.

The second transmission point 94 is shown to have four transmitter beams, 100, 101, 102 and 103. It can be appreciated that in different embodiments, more or less than four beams may be provided. It should be appreciated that in some embodiments, each beam may be provided by two beams—for example horizontal and vertically polarized. Only two transmission points are shown in FIG. 9, but it can be appreciate that in different embodiments, more than two transmission points may be provided.

FIG. 9 also shows four different beam index groups, group d 130, group g 140, group n 150 and group j 152. It can be appreciated that in different embodiments, more or fewer than four beam groups may be provided. Group d comprises the user equipment receiver beam set d and base station beams 96. Group g comprises the combination user equipment receiver beam sets d, g and j and N base station beams including beams 97 and 98. Group j comprises the user equipment receiver beam sets g and j and N base station beams including beams 100, 101, 102 and 103. Finally, beam group n comprises the user equipment receiver beam sets g and j and base station N transmitter beams including beams 102 and 103. N may be the same or different for the respective groups.

Figure 10:
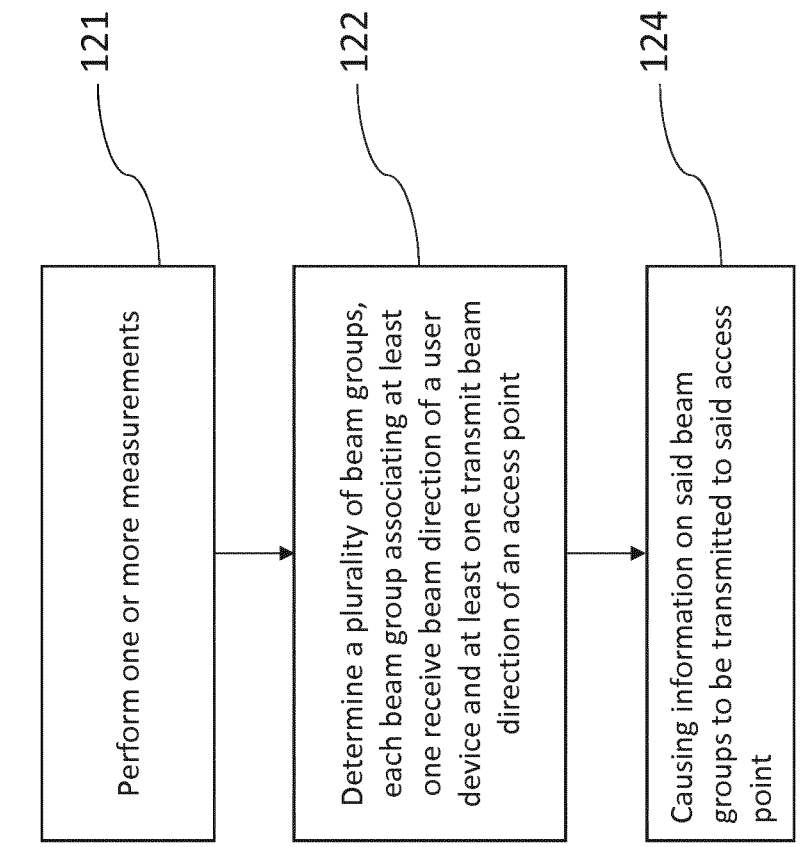
FIG. 10 shows a flowchart of an example method according to some embodiments.

With reference to FIG. 10, there is shown an example of a method according to an embodiment.

One or more measurements are performed, in step 121. These measurements, may, by way of example, involve measurement of channel parameters and/or beam quality parameters.

A plurality of beam groups is then determined, in step 122, each beam group associating at least one receive beam direction of a user device and at least one transmit beam direction of an access point. In some embodiments, there may be at least two receive beams. In some embodiments a beam group may comprise a plurality of transmitter beam directions. In some embodiments, at least two groups may be defined. Each group may have at least one receive beam and at least one AP transmit beam Different ones of the group may have different numbers of DL beams and receive beams with respect to other groups. For example one or more groups may have one downlink beam and one receive beam. One or more groups may be two downlink beams and one two receive beams. One or more groups may have two downlink beams, There may be P groups. P is an integer.

Each group may have X DL beams and Y receive beams where X and Y are integers with the same or different values.

In one embodiment, P is 2 or more. At least one of X and Y is greater than 1 for at least one group. In some embodiments, it is preferred, that at least one group has X and Y both greater than 1.

Information is then caused, in step 124, to be transmitted to said access point about the groups.

In some embodiment, UE will monitor the beams transmitted by the AP. (sweep technique used).

For a given receive beam direction, the UE will measure any DL beams transmitted by the AP. This may be a subset of the total number of DL beams The UE is able to distinguish the different beams from different identity information, The UE will also measure the strength of a given DL beam—e.g. to get the RSRP etc. The UE may also use a sweep technique.

The UE may use just single receive beam as the given beam direction in some embodiments. In other embodiments, the UE can use a set of RX beams to measure any DL TX from the access point The way how receive beam groups are formed may be UE implementation specific issue and may for example depend on one or more of receiver type, RX beam widths, grouping metric, etc. . . . An example of grouping metric could be to aggregate RX power over a set of RX antenna ports to receive a set of DL TX beams.

The UE does this for each set of receiver beams associated with antenna ports at UE.

The UE will define a group for that receive beam or receive beam set which has the N best DL beams and all beams have been processed with same receive beamformer Up to P groups are defined.

The report to the AP will identify DL beams which are in each group.

Information about which group is preferred is provided

Information is provided on the number of groups which can be active. In the above embodiments, the AP has provided the DL beams and the UE the receive beams. Alternatively or additionally, a similar grouping may be defined for the UL beams of the AP and the transmit beams of the UE. The AP and UE may use the DL grouping with corresponding UL beams for the uplink communication. Alternatively, the grouping may be determined on the basis of the DL beams/receive beams groups or may be determined separately. For example in some embodiments, the AP may define the grouping based on the transmit beams of the UE. In some embodiments, the AP may take the DL groups as a starting point and determine which of the groups is better for uplink.

It should be appreciated that in some embodiments the defined AP DL beams/UE receive beams group or groups can be used for communication in both directions, downlink and uplink. In one example one beam group may be used in both downlink and uplink communication. In another example one beam group may be used for downlink communication and another group for uplink communication. These examples are non-limiting.

In some embodiments, first AP TX and UE RX group is defined and then this can be used in other way around (AP RX and UE TX)

It should be appreciated that in some embodiments, this association can be performed also other way around so that the UE transmits reference and the AP receives and forms groups.

The required data processing apparatus and functions may be provided by means of one or more data processors. The apparatus may be provided in the communications device, in the control apparatus and/or in the access point. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method comprising:
   performing one or more measurements in a user device to determine one or more beam groups, each beam group associating at least one receive beam direction of the user device and at least one transmit beam direction of an access point, the at least one receive beam direction having a number of beam directions different from a number of beam directions of the at least one transmit beam direction; and
   causing information on said beam groups to be transmitted to said access point.

2. The method as claimed in claim 1, comprising causing preference information to be provided to said access point indicating which of said groups is to be preferentially used.

3. The method as claimed in claim 1, wherein said user device is to receive using p-n groups at a time where p is the number of groups and n is less than p, causing information to be provided to said access point indicating which p-n of the groups is to be used.

4. The method as claimed in claim 1, comprising receiving from said access point using at least one but not all of said groups and subsequently receiving from said access point using a different one or more of said groups.

5. The method as claimed in claim 1, comprising performing said measurements with respect to beam specific reference signals of respective transmit beam directions.

6. The method as claimed in claim 1, wherein said performing comprises performing beam quality measurements.

7. The method as claimed in claim 1, comprising obtaining respective identity information from one or more transmitted beams.

8. The method as claimed in claim 7, wherein the respective identity information comprises a respective beam specific reference signal.

9. The method as claimed in claim 7, wherein said information comprises one or more of beam quality information and beam identity information.

10. The method as claimed in claim 1, wherein said at least one transmit beam is received in a plurality of sweep blocks.

11. The method as claimed in claim 10, comprising obtaining respective identity information from one or more transmitted beams, wherein the identity information comprises sweep block information.

12. The method as claimed in claim 1, comprising receiving a request from said access point and in response to said request, causing said information to be transmitted to said access point.

13. The method as claimed in claim 1, wherein one of the following is performed:
   said information on the plurality of groups is transmitted separately; and
   said information on the plurality of groups is transmitted together.

14. The method as claimed in claim 1, wherein at least one group comprises two or more transmit beams.

15. The method as claimed in claim 1, comprising using said plurality of beam groups to determine which receive beam direction(s) of said access point and transmit beam direction(s) of said user device to use.

16. A non-transitory computer-readable storage medium storing instructions that when executed cause a processor to perform the method of claim 1.

17. A method comprising:
   receiving information at an access point from a user device about one or more beam groups, each beam group associating at least one receive beam direction of the user device and at least one transmit beam direction of the access point, the at least one receive beam direction having a number of beam directions different from a number of beam directions of the at least one transmit beam direction; and
   using information on said beam groups to control which transmit beam(s) are to be used to transmit to said user device.

18. A non-transitory computer-readable storage medium storing instructions that when executed cause a processor to perform the method of claim 17.

19. An apparatus comprising:
   at least one processor;
   and at least one memory including computer program code;
   the at least one memory and the computer program code configured to, with the at least one processor, cause the apparatus at least to:
   perform one or more measurements in a user device to determine one or more beam groups, each beam group associating at least one receive beam direction of the user device and at least one transmit beam direction of an access point, the at least one receive beam direction having a number of beam directions different from a number of beam directions of the at least one transmit beam direction; and
   cause information on said beam groups to be transmitted to said access point.

* * * * *